United States Patent
Sato

(10) Patent No.: US 12,385,603 B2
(45) Date of Patent: Aug. 12, 2025

(54) METHOD AND DEVICE FOR MANUFACTURING HIGH-PRESSURE TANK LINER

(71) Applicant: HONDA MOTOR CO., LTD., Tokyo (JP)

(72) Inventor: Takaharu Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 18/174,878

(22) Filed: Feb. 27, 2023

(65) Prior Publication Data

US 2023/0279998 A1 Sep. 7, 2023

(30) Foreign Application Priority Data

Mar. 4, 2022 (JP) .................................. 2022-033713

(51) Int. Cl.
*F17C 13/00* (2006.01)

(52) U.S. Cl.
CPC .... *F17C 13/002* (2013.01); *F17C 2201/0109* (2013.01); *F17C 2203/0604* (2013.01); *F17C 2209/221* (2013.01)

(58) Field of Classification Search
CPC ..... B29C 37/02; B29C 65/20; B29C 65/7802; B29C 65/7858; B29C 66/80; B29C 69/001; B29L 2031/712; F17C 1/16; F17C 13/00; F17C 13/002; F17C 2201/0109; F17C 2203/0604; F17C 2209/00; F17C 2209/221; Y02E 60/32; Y02P 70/50

USPC ........... 156/60, 242, 245, 272.2, 273.7, 292, 156/304.1, 304.2, 304.5, 304.6, 308.2, 156/309.6, 309.9, 322, 349, 499, 538, 156/539, 556

See application file for complete search history.

(56) References Cited

U.S. PATENT DOCUMENTS

| | | | |
|---|---|---|---|
| 5,087,308 A * | 2/1992 | Wermelinger | .... B29C 66/12441 219/535 |
| 5,407,520 A * | 4/1995 | Butts | ....................... B29C 63/24 285/21.2 |
| 2004/0256046 A1* | 12/2004 | Sakakibara | ........... B29C 66/543 156/73.6 |
| 2020/0332960 A1 | 10/2020 | Sato et al. | |

FOREIGN PATENT DOCUMENTS

DE 3814516 C1 * 3/1989
WO 2019/131737 A1 7/2019

* cited by examiner

*Primary Examiner* — Philip C Tucker
*Assistant Examiner* — Brian R Slawski
(74) *Attorney, Agent, or Firm* — Rankin, Hill & Clark LLP

(57) ABSTRACT

A manufacturing method for a high-pressure tank liner achieves a good welding quality between a pair of liner halves without removing burrs in advance before welding together the liner halves, includes steps of: arranging the pair of liner halves to face each other; adjusting parallelism between end surfaces of the liner halves; and welding the end surfaces of the liner halves together to integrate them, wherein the step of adjusting the parallelism is performed by clamping the parallelism adjustment jig between the end surfaces of the liner halves while avoiding the burrs formed on the end surfaces of the liner halves.

8 Claims, 14 Drawing Sheets

METHOD AND DEVICE FOR MANUFACTURING HIGH-PRESSURE TANK LINER

CROSS REFERENCE TO RELATED APPLICATIONS

The present invention relates to and asserts priority from Japanese patent application No. 2022-033713 filed on Mar. 4, 2022, and incorporates the entirety of the contents and subject matter of all the above application herein by reference.

TECHNICAL FIELD

This invention relates to a method for manufacturing a high-pressure tank liner and a device for manufacturing the high-pressure tank liner.

BACKGROUND ART

One kind of conventional so-called high-pressure tanks for filling high-pressure gas is known as having a fiber-reinforced resin layer formed on an outside of a cylindrical liner (high-pressure tank liner) made of synthetic resin (see, for example, PTL 1). This type of liner is formed by welding cylindrical liner halves made of thermoplastic resin produced by an injection molding technique.

In a conventional manufacturing method of the liner (see, for example, PTL 1), parallelism between end surfaces of liner halves facing with each other is set within a predetermined range prior to a welding step of the liner halves. Specifically, a support jig is temporarily attached on a back of each of the facing liner halves as a pressing member, and then each of the liner halves is pressed by the support jig with a predetermined load. The support jigs are positioned with respect to the liner halves so that the end surfaces of the liner halves are kept in the predetermined range of parallelism by a reaction force received from each of the liner halves contacting to each other. This means that the support jigs closely contact with the liner halves.

CITATION LIST

Patent Literature

PTL 1: International Publication No. WO/2019/131737

SUMMARY OF INVENTION

Technical Problem

However, the conventional liner halves used for a liner produced (see, for example, PTL 1) have burrs generated during the injection molding, which burrs bite into welding surfaces between liner halves, resulting degradation in their welding quality.

In addition, the burrs of the liner halves are interposed between the liner halves, which interferes with the parallelism between the end surfaces of the liner halves when adjusting the parallelism between the liner halves. Therefore, the support jig may not be positioned with respect to the liner halves so that the support jig can secure the parallelism between the end surfaces of the liner halves to be preconfigured before welding.

In order to avoid the above problems, it may be thought to remove burrs in advance before welding two liner halves together, with either a manual work by a worker or a work by a machining robot. However, a burr-eliminating step prior to a welding step not only complicates the liner manufacturing process, but also possibly damage welded surfaces, and thereby might degrade the welding quality.

An object of the present invention is to provide a method and device for manufacturing a high-pressure tank liner that can achieve good quality of welding between liner halves without a burr removal step prior to the welding between the liner halves.

Solution to Problem

A method for manufacturing a high-pressure tank liner according to the present invention, which method solves the above-mentioned problem, including: arranging a pair of liner halves so that the liner halves face each other, adjusting parallelism between end surfaces of the liner halves, and welding the end surfaces of the liner halves together to integrate the liner halves, wherein the adjusting the parallelism is performed by clamping a parallelism adjustment jig between the end surfaces of the liner halves in a manner of avoiding burrs formed on the end surfaces of the liner halves.

In another aspect of the invention, a manufacturing device for a high-pressure tank liner according to the present invention, which solves the above-mentioned problem, includes a parallelism adjustment jig for adjusting parallelism between end surfaces of a pair of liner halves by clamping the adjustment jig between the end surfaces of the liner halves arranged facing each other with a predetermined load in a manner of avoiding burrs formed on the end surfaces of the liner halves, a heater for heating to melt the end surfaces of the liner halves, and a pair of support jigs supporting each of the liner halves so as to weld together the melted end surfaces of the liner halves.

DESCRIPTION OF EMBODIMENTS

Figure 1:
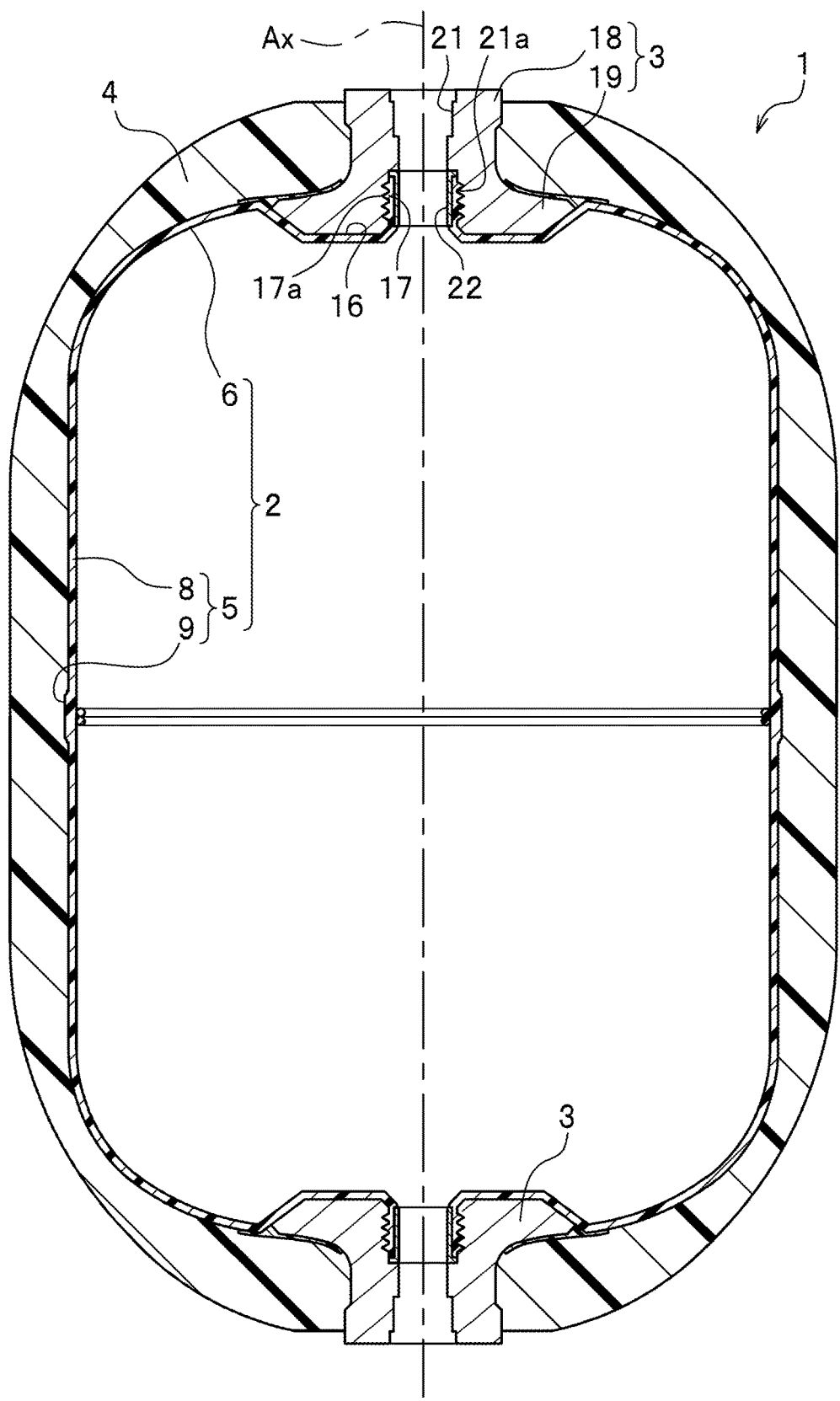
FIG. 1 is a longitudinal cross-sectional view of a high-pressure tank using a high-pressure tank liner produced by a manufacturing method according to an embodiment of the present invention.

Next is a detailed description of an embodiment, which is one of configuration examples implementing the invention, referring to the drawings as appropriate.

First, a description is given of a high-pressure tank using a high-pressure tank liner provided by a manufacturing method according to the present embodiment.

<<High-Pressure Tank>>

FIG. 1 shows a longitudinal cross-sectional view of a high-pressure tank 1.

The high-pressure tank 1 in the present embodiment is assumed to be installed, for example, in a fuel cell vehicle to store hydrogen gas supplied to a fuel cell system. However, the high-pressure tank 1 is not limited to this usage and may be used for other high-pressure gases.

As shown in FIG. 1, the high-pressure tank 1 includes a high-pressure tank liner 2 (hereinafter referred to simply as "liner 2"), which is described in detail below, a mouthpiece 3 connected to the liner 2, and a fiber-reinforced resin layer 4 covering outsides from the liner 2 to the mouthpiece 3.

The mouthpiece 3 is assumed, for example, to be formed of a metallic material such as an aluminum alloy. The mouthpiece 3 includes a cylindrical mouthpiece body 18 having at its inside a fill and drain hole 21, and a flange 19 formed at one axial end of the mouthpiece body 18. The fill and drain hole 21 communicates with an inside of the high-pressure tank 1 at one end of the hole 21 at which end the flange 19 is formed. The other end of the fill and drain hole 21 is connected to a pipe (omitted in the figures) that is connected to the aforementioned fuel cell system or the like.

On an inner circumference of the fill and drain hole 21 at the one end of the mouthpiece body 18, there is formed a thread 21a that engages with a thread 17a formed on a tubular portion 17 of the liner 2 described below. An O-ring (not shown) is attached between an end of the tubular portion 17 of the liner 2 and the inner circumference of the fill and drain hole 21.

A cylindrical collar 22 made of metal material is disposed inside the fill and drain hole 21. This collar 22 extends from one end supported by the inner circumference of the fill and drain hole 21 to the liner 2 and is fitted into inside of the tubular portion 17 of the liner 2.

The fiber-reinforced resin layer 4 in the present embodiment is assumed to be obtained by pre-impregnating matrix resin into reinforcing fiber to obtain prepreg, winding the prepreg around outer surfaces of the liner 2 and the mouthpiece 3, and curing the matrix resin.

The reinforcing fiber in the present embodiment is assumed to be a strip-like roving (omitted in the figures), which is formed by assembling a plurality of strands made of a plurality of carbon fiber filaments. However, the reinforcing fibers are not limited to the above strip-like roving but can also use, for example, aramid fiber, boron fiber, alumina fiber, silicon carbide fibers, and the like.

The matrix resin in the present embodiment is assumed to be made of cured thermosetting resin such as epoxy resin, phenol resin, unsaturated polyester resin, and polyimide resin.

Note that a method of forming the fiber-reinforced resin layer 4 is not limited to a method using the above-described prepreg. Thus, the fiber-reinforced resin layer 4 may be made, for example, by impregnating matrix resin into resin-unimpregnated reinforcing fibers that is wound around the liner 2 and then curing the reinforcing fibers.

<<High-Pressure Tank Liner>>

Next, the liner 2 (see FIG. 1) produced by this manufacturing method is described.

The liner 2 is a hollow body made of thermoplastic resin. A thermoplastic resin include, but are not limited to, for example, polyamide resin, polyethylene resin, and the like.

The liner 2 in the present embodiment includes a body part 5 made of a cylindrical body part 5 and a mirror part 6 that are integrally molded at both ends of the body part 5.

The body part 5 includes a major portion 8 that is formed with a predetermined outer diameter and occupies most of the body part 5 along the axis Ax, and a diameter-expanded portion 9 that is formed in a center along the axis Ax of the body part 5 and has a larger diameter than the major portion 8.

The diameter-expanded portion 9 is formed by cutting a joint 36 (see FIG. 5F) that is formed by connecting the ends of the pair of the liner halves 31 (see FIG. 2) by welding, as is explained in detail below.

As shown in FIG. 1, the mirror part 6 is flattened-bowl shaped to converge in a manner of gradually shrinking in diameter as going away from the body part 5 to outward along the axis Ax.

The radial center of the mirror part 6 is provided with a recess portion 16 that is recessed to match a shape of the flange 19 of the mouthpiece 3.

A center of the recessed portion 16 is provided with the aforementioned tubular portion 17 formed to protrude toward an inside of the fill and drain hole 21 of the mouthpiece 3. The thread 17a that engages with the thread 21a of the fill and drain hole 21 described above is formed on an outer circumference of the tubular portion 17.

<<Manufacturing Device of High-Pressure Tank Liner>>

Next, the manufacturing device of the liner 2 (see FIG. 1) is described.

Figure 2:
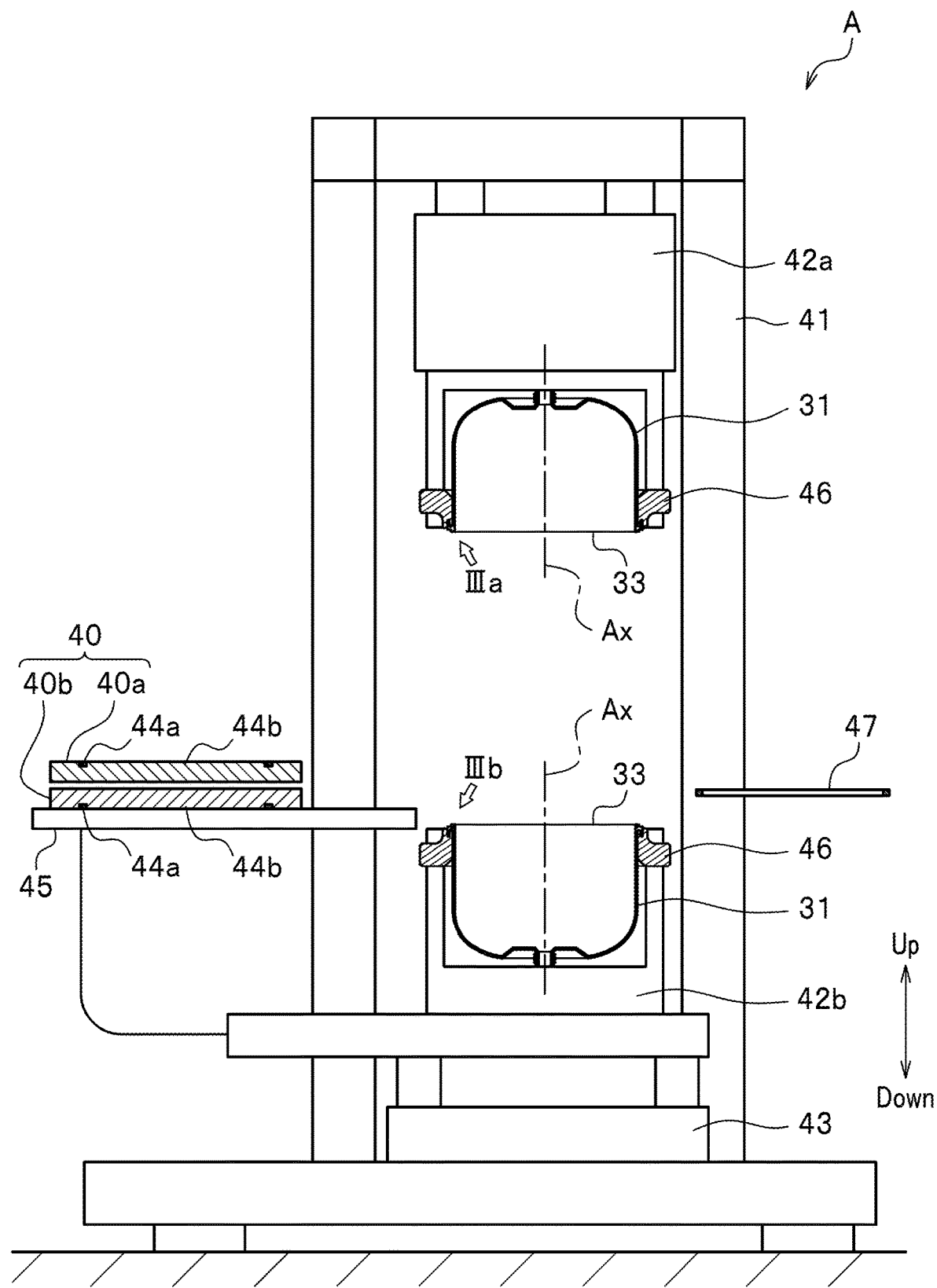
FIG. 2 is an illustration of a structure of a manufacturing device of the high-pressure tank liner according to the embodiment of the present invention.

FIG. 2 is an illustration of a configuration of a manufacturing device A according to the present embodiment. FIG. 2 is a longitudinal cross-sectional view of the manufacturing device A. The words "up and down directions" in the below description are based on the up and down directions in FIG. 2, which are corresponds to up and down directions of the manufacturing device A.

As shown in FIG. 2, the manufacturing device A is configured to weld together a pair of liner halves 31 to form a single unit.

First, a description is given of the liner half 31. The liner half 31 is substantially the same in its shape as that when the liner 2 shown in FIG. 1 is divided in two at a center of the axis Ax, except that the liner half 31 has a flange 32 (see FIGS. 3A and 3B), which is described below.

The liner halves 31 are welded together on their openings 33 (see FIG. 2) to form a single unit.

As shown in FIG. 2, the manufacturing device A mainly includes a frame 41 placed on a contact surface such as the ground, an upper support section 42a that supports an upper liner half 31 of the pair of liner halves 31 at a top of the frame 41 via a support jig 46, a lower support section 42b that supports the lower liner half 31 by connecting it to a lifting mechanism 43 via the support jig 46, the lifting mechanism 43 lifting and lowering the lower liner half 31, and a parallelism adjustment jig 47 that adjusts the parallelism between the end surfaces of the pair of liner halves 31 within a predetermined range, a heater 40 heating to melt a part of each liner half 31, and a transport mechanism 45 transporting the heater 40.

At a lower end of the upper support section 42a, there is attached the support jig 46 that supports the liner half 31 with the opening 33 facing downward.

At an upper end of the lower support section 42b, there is attached the support jig 46 that supports the liner half 31 with the opening 33 facing upward.

Each of the pair of the upper and lower support jigs 46 is arranged to engage the flange 32 (see FIGS. 3A and 3B) of the liner half 31 and to contact the outer circumference of the body part 5 (see FIGS. 3A and 3B) of the liner half 31, as is next explained. This causes the support jig 46 to support each of the liner halves 31 on each of the upper support section 42a and lower support section 42b.

Figure 3A:
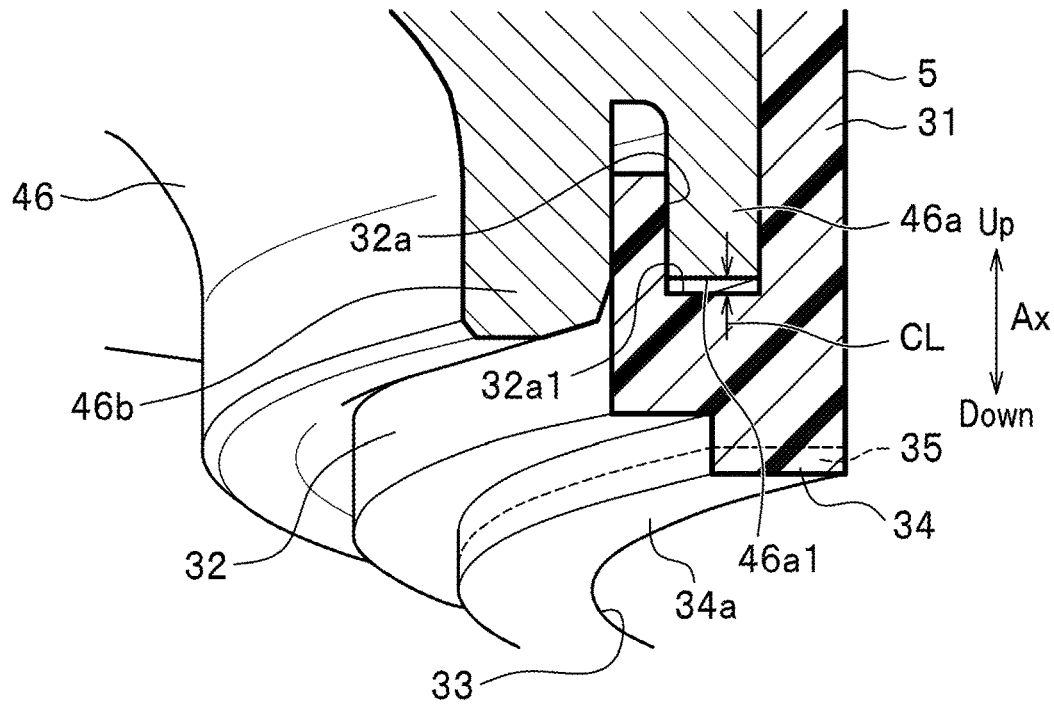
FIG. 3A is a partially enlarged perspective view of a support jig constituting a part of the manufacturing device shown in FIG. 2, viewed in a direction IIIa.
Figure 3B:
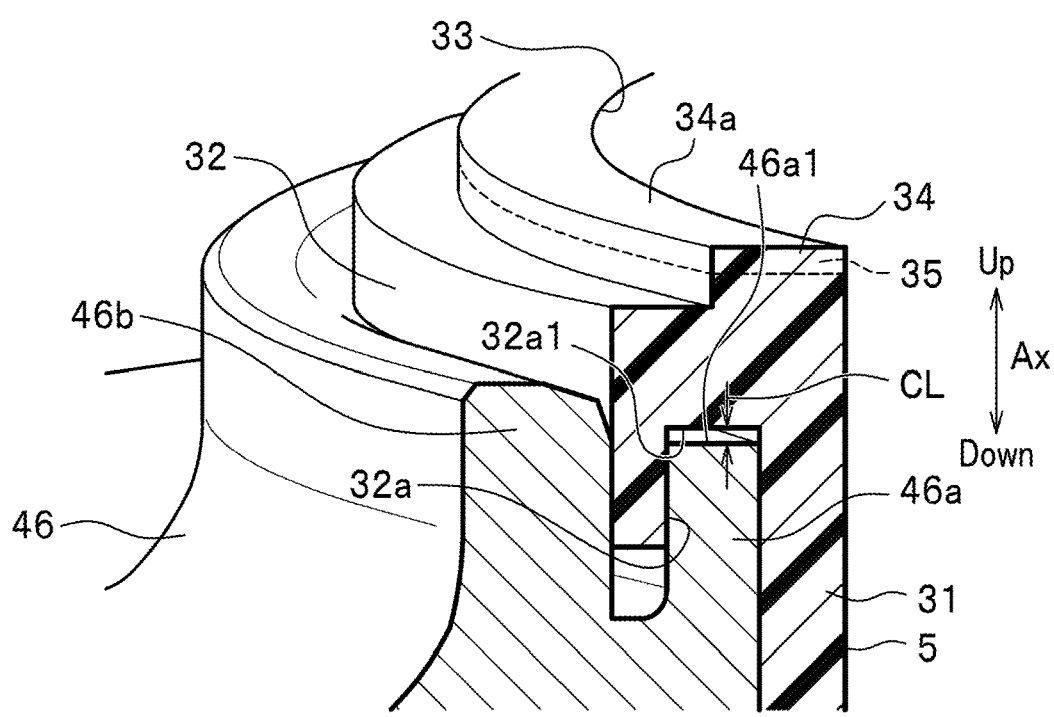
FIG. 3B is a partially enlarged perspective view of the support jig constituting the part of the manufacturing device shown in FIG. 2, viewed in a direction IIIb.

FIG. 3A is a partially enlarged perspective view of the support jig 46 constituting a part of the manufacturing device A viewed in a direction IIIa of FIG. 2. FIG. 3B is a partially enlarged perspective view of the support jig 46 viewed in a direction IIIb of FIG. 2.

As shown in FIG. 3A, the opening 33 of the liner half 31 placed on the upper half is provided with a flange 32 and a protruding end 34 having a melting allowance 35, which is explained in detail below.

The flange 32 is an annulus that is coaxial with and integrally molded into the body part 5 to extend radially outward from the body part 5 of the liner half 31.

The flange 32 has a circumferential groove 32a formed. This circumferential groove 32a extends along a circumference of the flange 32 and open upward.

A bottom surface 32a1 of the circumferential groove 32a is formed with a flat surface and is parallel to an end surface 34a of the protruding end 34 that is also formed with a flat surface.

On the other hand, the upper support jig 46 of the pair of upper and lower support jigs 46 is provided with an inner claw 46a and an outer claw 46b that engage the flange 32, as shown in FIG. 3A.

The inner claw 46a contacts the outer circumference of the body part 5 of the liner half 31 and fits into the circumferential groove 32a of the flange 32.

An end surface 46a1 of the inner claw 46a is formed with a flat surface and is parallel to the bottom surface 32a1 of the circumferential groove 32a.

The outer claw 46b is disposed on the outer circumference of the inner claw 46a and is arranged to contact the outer circumferential surface of the flange portion 32. Specifically, the outer claw 46b clamps a radially outer wall of the circumferential groove 32a of the flange portion 32 with the inner claw 46a fitted into the circumferential groove 32a.

As shown in FIG. 3B, the lower liner half 31 and its support jig 46 are arranged to have a vertically symmetrical structure with respect to the upper liner half 31 and its support jig 46 shown in FIG. 3A.

In other words, as shown in FIG. 3B, the opening 33 of the lower liner half 31 includes a flange 32 having a circumferential groove 32a and a protruding end 34 provided with a melting allowance 35, as the upper liner half 31 (see FIG. 3A).

In addition, like the upper support jig 46 shown in FIG. 3A, the lower support jig 46 also includes an inner claw 46a that fits into the circumferential groove 32a of the flange portion 32 and an outer claw 46b that clamps a wall of the flange portion 32 outside the radial direction of the circumferential groove 32a between the inner claw 46a and the outer claw 46b itself. The end surface 46a1 of the inner claw 46a, the bottom surface 32a1 of the circumferential groove 32a, and the end surface 34a of the protruding end portion 34 are formed with flat surfaces and are parallel to each other.

The protruding end 34 is an annulus that is coaxial with the body part 5, integrally molded into an end surface of the opening 33 of the liner half 31, as shown in FIGS. 3A and 3B.

An outer diameter of the protruding end 34 is configured to be larger than the outer diameter of the body part 5 of the liner half 31 and smaller than the outer diameter of the flange 32.

Further, an inner diameter of the protruding end 34 is set as the same as the inner diameter of the liner half 31.

Furthermore, a thickness of the protruding end 34 along the axis Ax of the liner half 31 is thicker than the melting allowance 35 for welding together the liner halves 31 as described below.

Next description is given of the parallelism adjustment jig 47 (see FIG. 2) constituting a part of the manufacturing device A (see FIG. 2).

The parallelism adjustment jig 47 is a jig used in the parallelism adjustment (see FIG. 5B) between the end surfaces 34a of the liner halves 31 (protruding ends 34) shown in FIGS. 3A and 3B, which adjustment is performed prior to the heating step (see FIG. 5D) of the liner half 31 that included by a "high pressure tank liner manufacturing method" described below.

The parallelism adjustment jig 47 in this embodiment is assumed to be made of synthetic resin, elastomer, or metal.

Figure 5A:
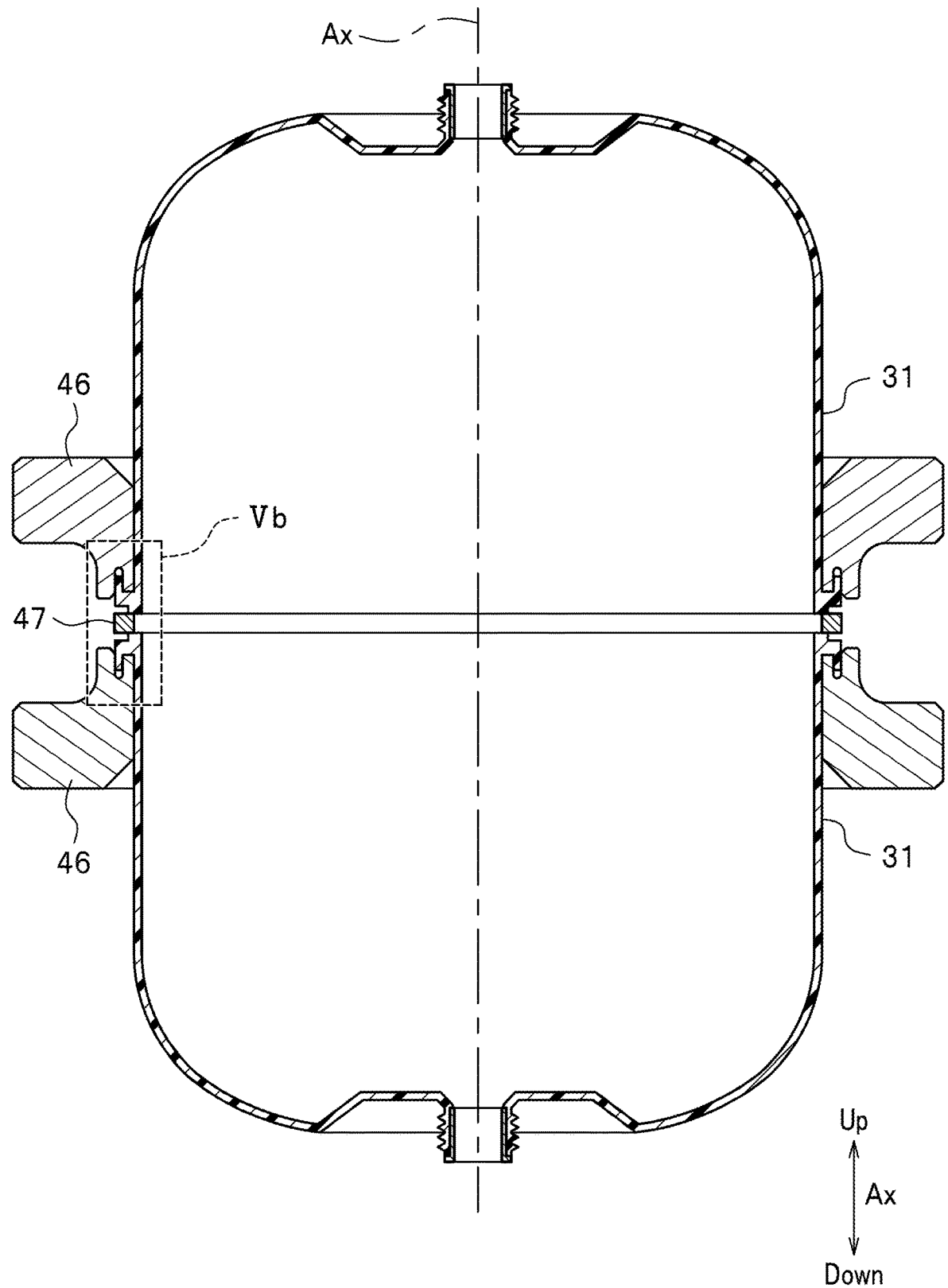
FIG. 5A is an illustration of a step of adjusting parallelism between end surfaces of liner halves in a manufacturing method of the high-pressure tank liner according to the embodiment of the present invention.
Figure 5B:
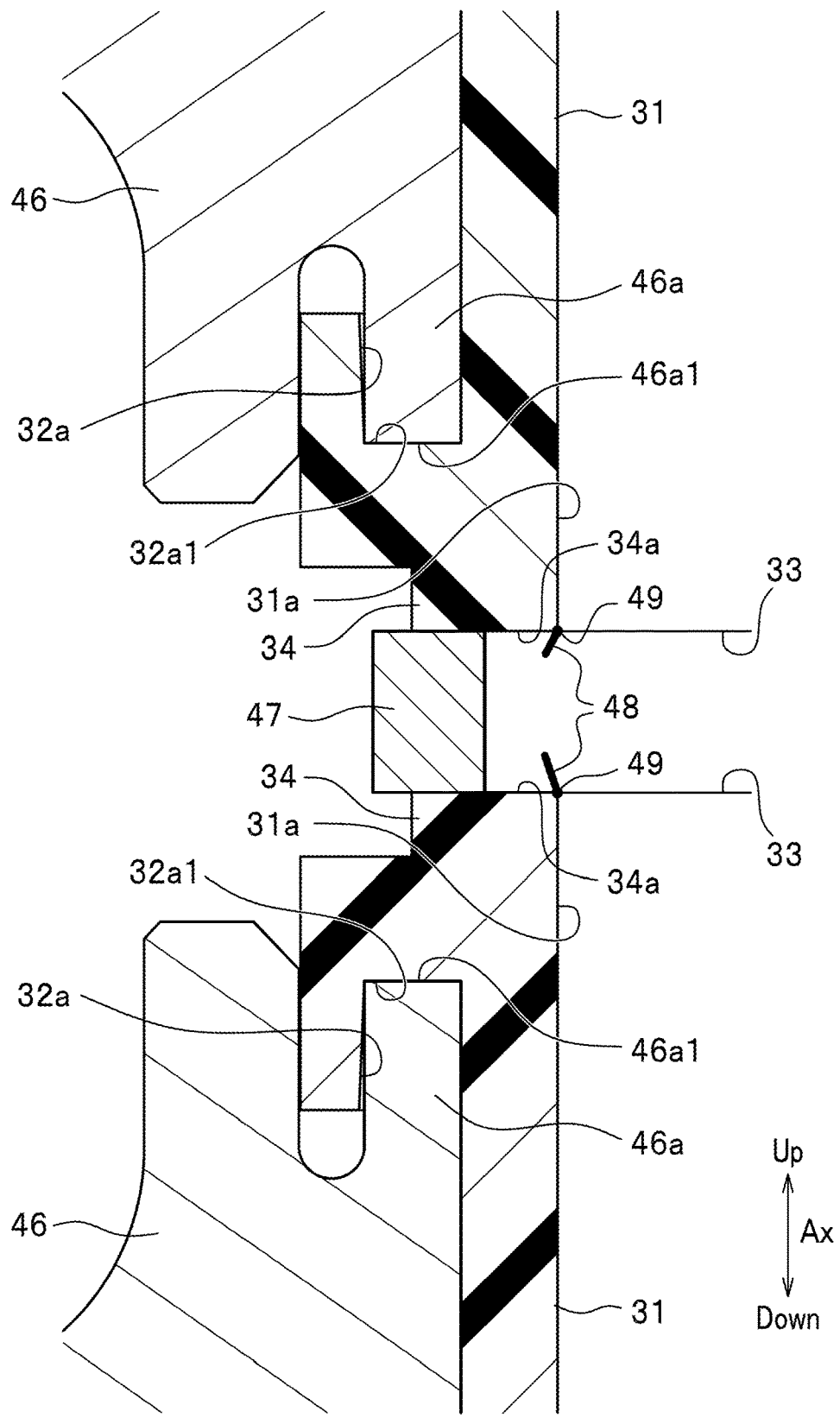
FIG. 5B is a partially enlarged view of a part Vb shown in FIG. 5A.

The parallelism adjustment jig 47 (see FIG. 2) is clamped between the liner halves 31 (see FIG. 2) in the parallelism adjustment step (see FIG. 5B).

Figure 4A:
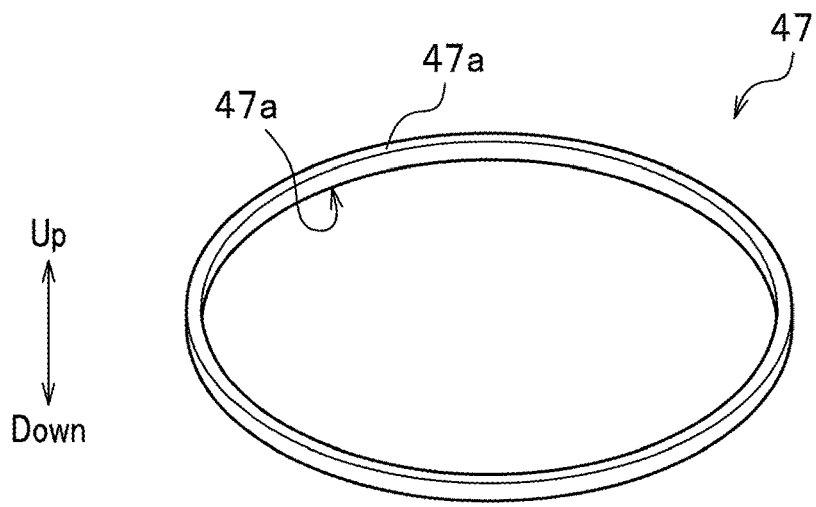
FIG. 4A is an overall perspective view of a parallelism adjustment jig constituting a part of the manufacturing device shown in FIG. 2.

FIG. 4A is an overall perspective view of the parallelism adjustment jig 47.

As shown in FIG. 4A, the parallelism adjustment jig 47 is formed of an annulus having circumferentially extending end surfaces 47a at each of the top and bottom end.

Each of the top and bottom end surfaces 47a is formed with flat surfaces and parallel to each other. A cross-section of the parallelism adjustment jig 47 has a rectangular shape, which is not shown in the figure.

Of these top and bottom end surfaces 47a, the top end surface 47a is placed to contact the end surface 34a of the protruding end 34 shown in FIG. 3A in the parallelism adjustment step (see FIG. 5B) described below. The bottom end surface 47a is placed to contact the end surface 34a of the protruding end 34 shown in FIG. 3B in the parallelism adjustment step (see FIG. 5B) described below. In other words, inner and outer diameters of the parallelism adjustment jig 47 shown in FIG. 4A are set in correspondence with the inner and outer diameters of the end surface 34a of the protruding end 34 shown in FIGS. 3A and 3B. Specifically, the inner diameter of the parallelism adjustment jig 47 is larger than the inner diameter of the protruding end 34 (see FIGS. 3A and 3B), and the outer diameter of the parallelism adjustment jig 47 is larger than the outer diameter of the protruding end 34.

Further, the inner and outer diameters of the parallelism adjustment jig 47 are set to avoid burrs 48 (see FIG. 5B) extending between the end surfaces 34a of the facing protruding ends 34, as described below.

Note that the parallelism adjustment jig 47 in the present embodiment is assumed to be transported by a specified transport device when the parallelism adjustment step is performed, but it may be transported to a predetermined position by a worker.

Next, the heater 40 (see FIG. 2) that constitutes a part of the manufacturing device A (see FIG. 2), is described.

As shown in FIG. 2, the manufacturing device A is equipped with a heater 40a for heating the liner half 31 located on the upper position and a heater 40b for heating the liner half 31 located on the lower position. Note that the heaters 40a and 40b are simply referred to as "heater 40" when it is not necessary to distinguish them.

The heater 40 includes a heating source 44a and a base member 44b that supports the heating source 44a.

The heater 40 in the present embodiment heats the end surfaces 34a of the protruding ends 34 to melt the melting allowances 35 (see FIGS. 3A and 3B) of the protruding ends 34 during the heating step of the liner half 31 (see FIG. 5D), which step is included by the "high-pressure tank liner manufacturing method" described below.

Figure 4B:
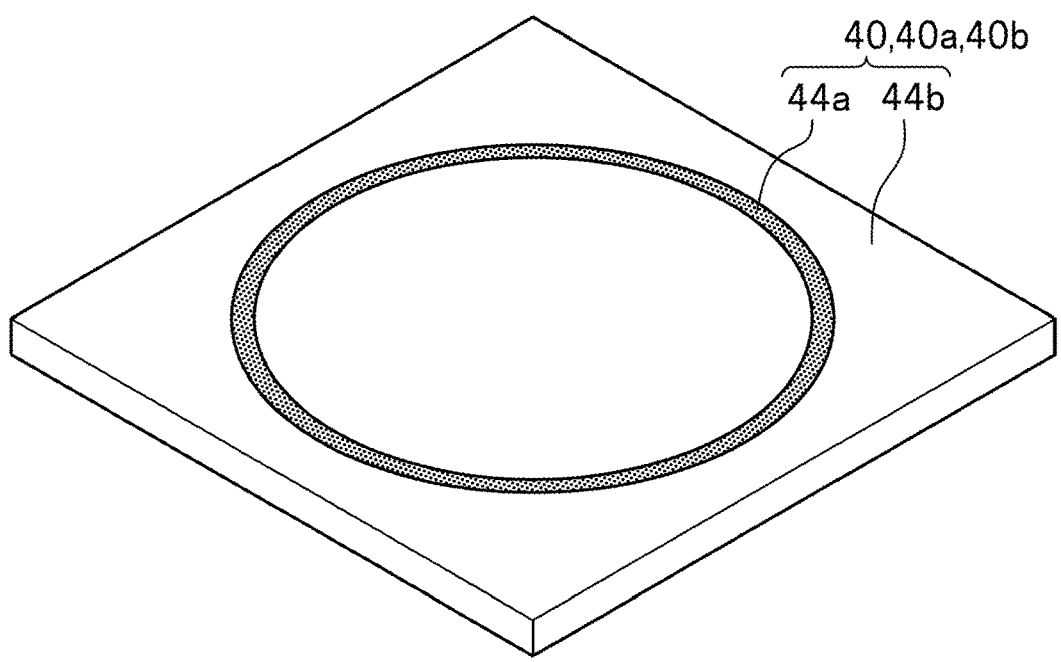
FIG. 4B is an overall perspective view of a heater constituting a part of the manufacturing device shown in FIG. 2.

FIG. 4B is an overall perspective view of the heater 40.

As shown in FIG. 4B, the heater 40 in the present embodiment includes a base member 44b that is made of a board having a rectangular planar shape, and a heating source 44a embedded in a ring shape in the base member 44b.

Incidentally, the heating source 44a in the present embodiment is assumed to be, but not limited to, one that utilizes Joule heat from an electric heating wire or the like, or one that utilizes radiant heat from far-infrared radiation.

Figure 5C:
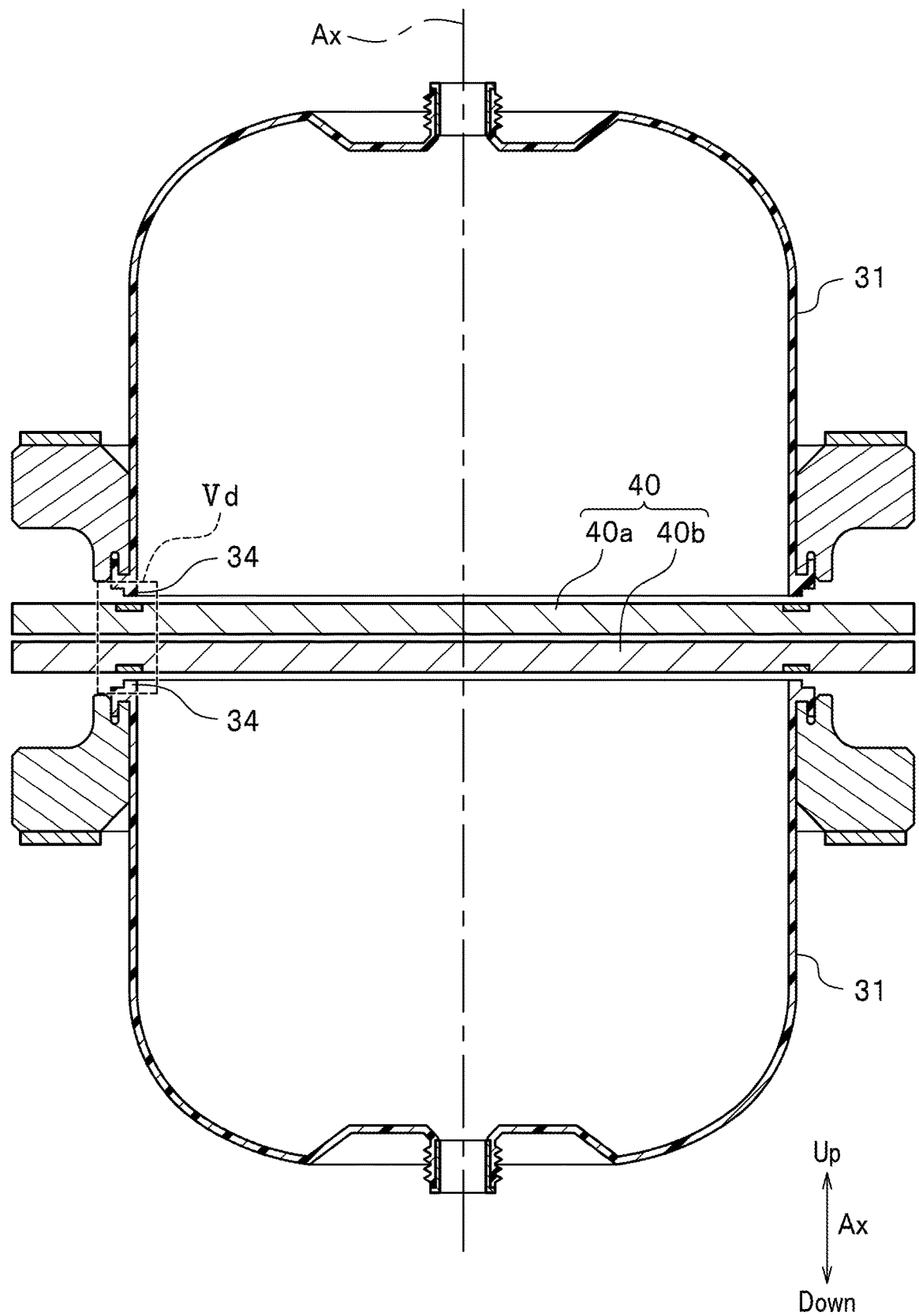
FIG. 5C is an illustration of a step of heating the end surfaces of the liner halves in the manufacturing method of the high-pressure tank liner according to the embodiment of the present invention.
Figure 5D:
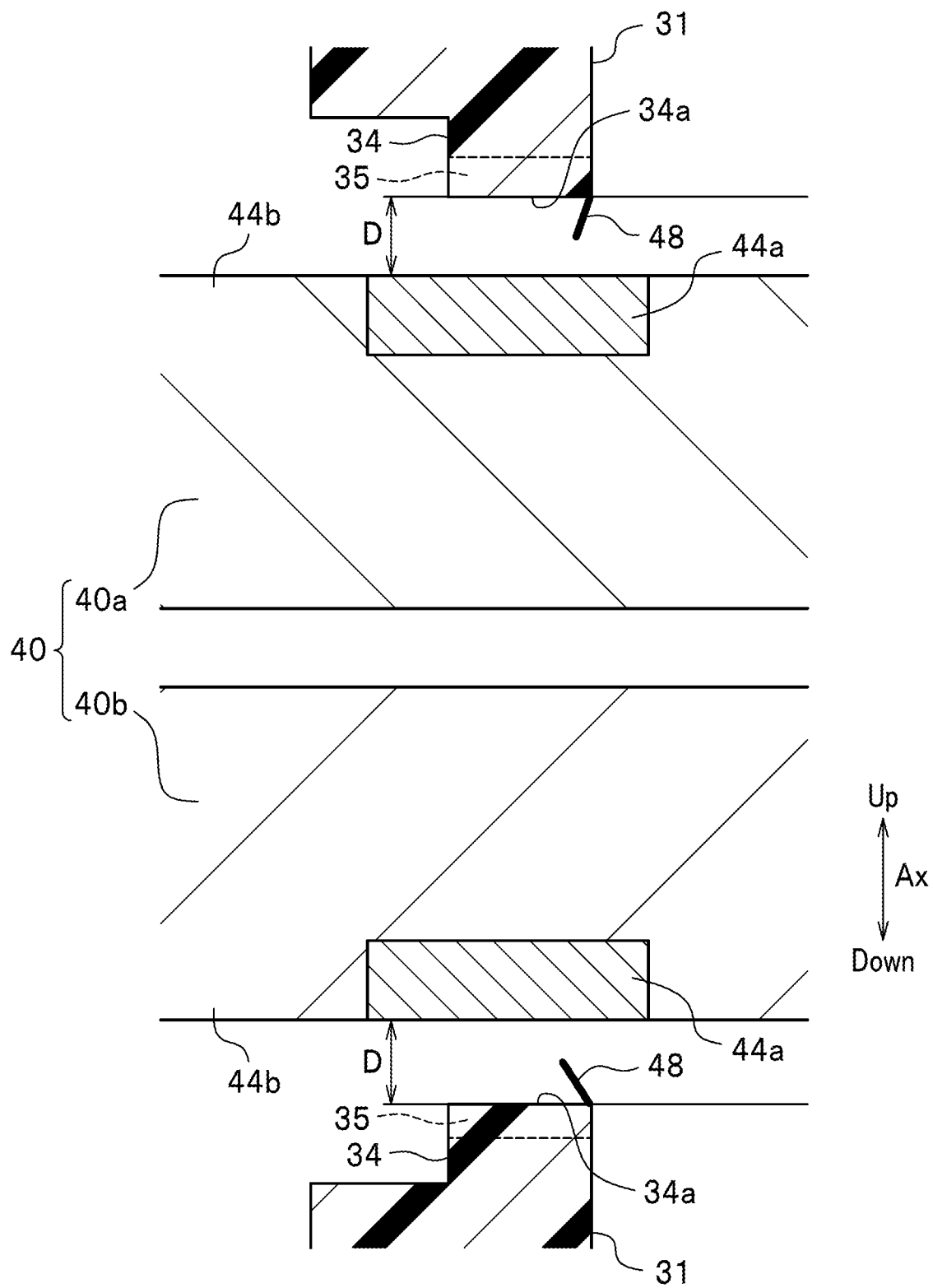
FIG. 5D is a partially enlarged view of a part Vd shown in FIG. 5C.

The heating source 44a of the heater 40a shown in FIG. 2 is positioned to face the end surface 34a of the protruding end 34 shown in FIG. 3A in the heating step of the liner half 31 (see FIG. 5D).

Further, the heating source 44a of the heater 40b shown in FIG. 2 is also positioned to face the end surface 34a of the protruding end 34 shown in FIG. 3B in the heating step of the liner half 31 (see FIG. 5D).

This means that the inner and outer diameters of the heating source 44a in each of the heaters 40a and 40b shown in FIG. 2 are configured to correspond to the inner and outer diameters of the end surfaces 34a of the protruding ends 34 shown in FIGS. 3A and 3B.

The heater 40 is transported by the transport mechanism 45 so as to be placed at a position just between the liner halves 31 in the heating step of the liner halves 31, and is transported so as to be moved away from the position between the liner halves 31 in the below-described steps except for the heating step.

<<Method for Manufacturing High-Pressure Tank Liner>>

Next, a manufacturing method of the present embodiment is explained while describing an operation of the manufacturing device A (see FIG. 2).

This manufacturing method includes a arranging step of a pair of liner halves 31 (see FIG. 2), a parallelism adjustment step of the end surfaces 34a (see FIGS. 3A and 3B) of the protruding ends 34 of the liner halves 31, a heating step of the end surfaces 34a (see FIGS. 3A and 3B) of the protruding ends 34 of the liner halves 31 (See FIG. 2), a welding step of the liner halves 31 (see FIG. 2), and a cutting step that applies cutting to a joint portion between the liner halves 31 (see FIG. 2) that are integrated in the welding step.

Figure 5E:
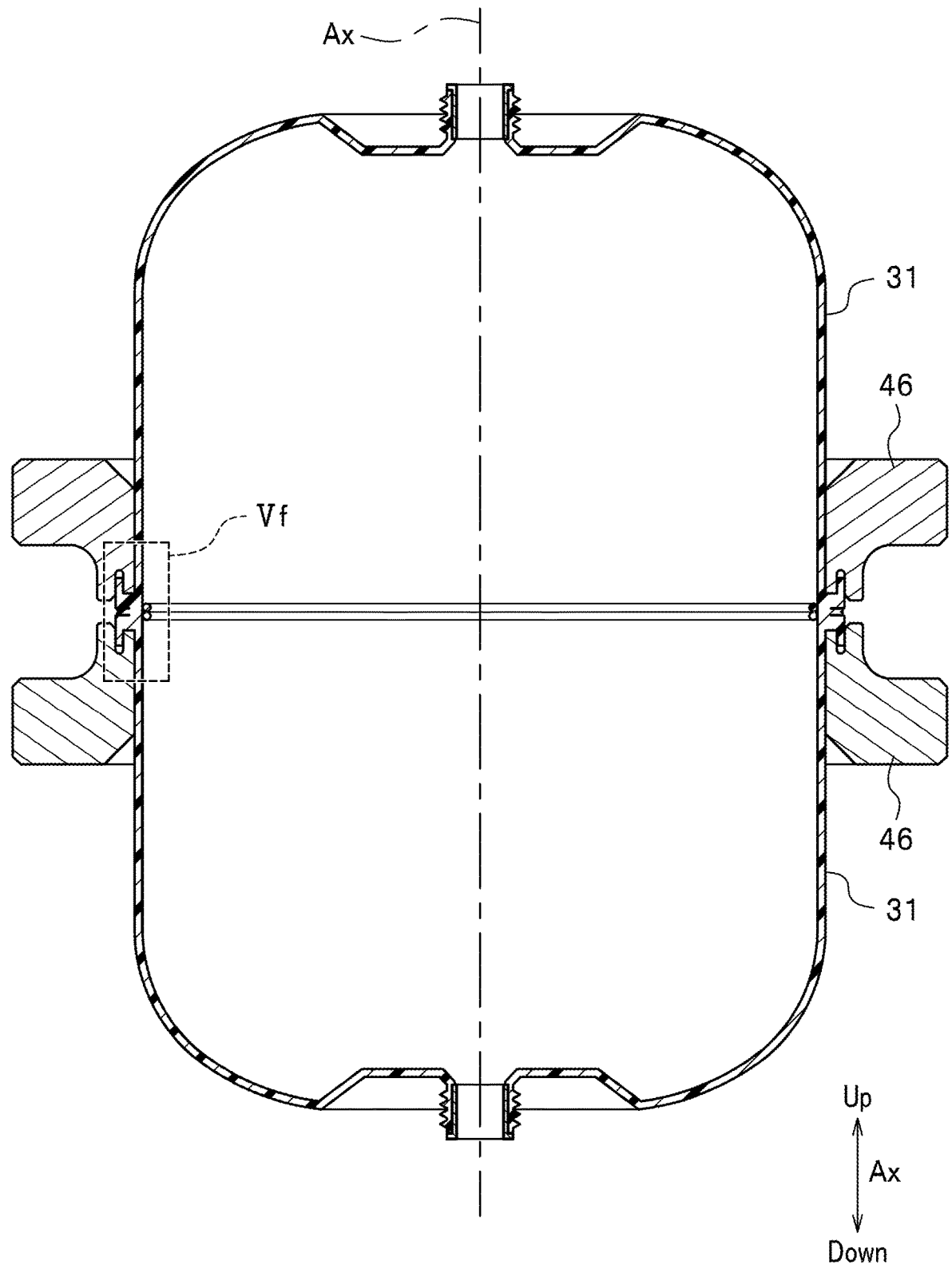
FIG. 5E is an illustration of a step of welding the liner halves in the manufacturing method of the high-pressure tank liner according to the embodiment of the present invention.
Figure 5F:
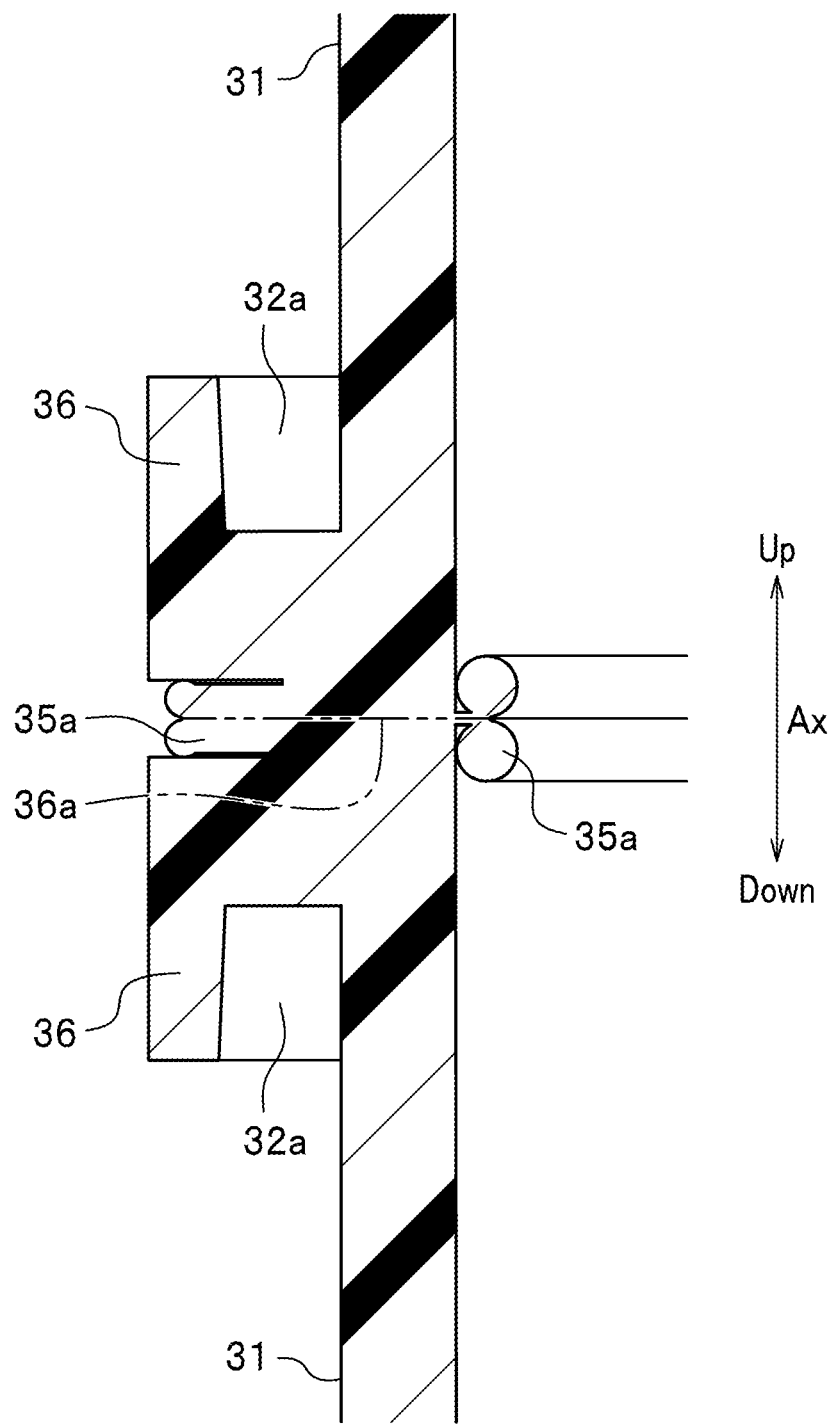
FIG. 5F is a partially enlarged view of a part Vf shown in FIG. 5E.
Figure 5G:
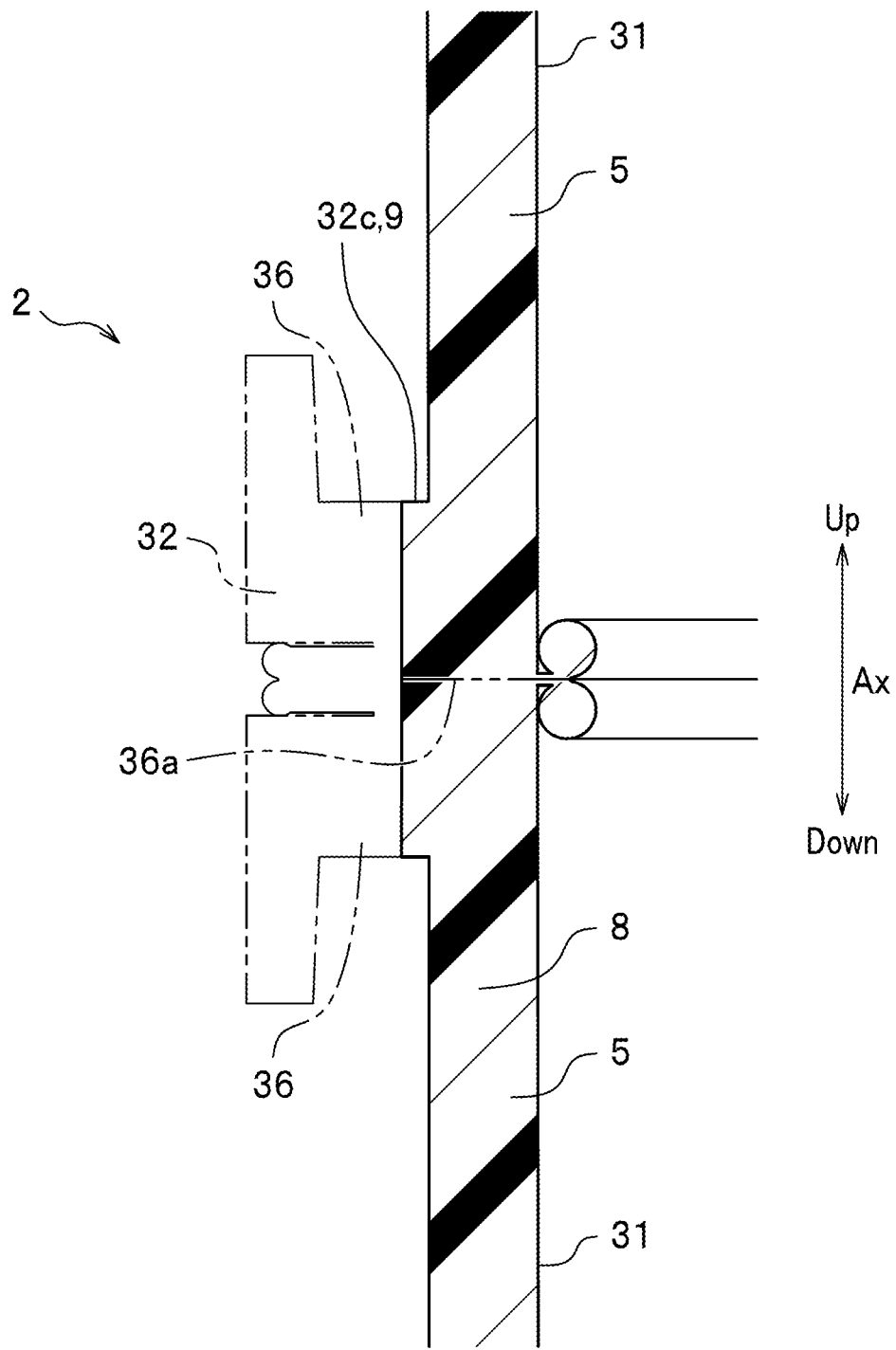
FIG. 5G is an illustration of a cutting step in the manufacturing method of the high-pressure tank liner according to the embodiment of the present invention.

FIG. 5A is an illustration of the parallelism adjustment step between the liner halves 31. FIG. 5B is a partially enlarged view of the portion Vb of FIG. 5A. FIG. 5C is an illustration of the heating step of the protruding ends 34 of the liner halves 31. FIG. 5D is a partially enlarged view of the portion Vd of FIG. 5C. FIG. 5E is an illustration of the welding step between the liner halves 31. FIG. 5F is an enlarged view of the portion Vf of FIG. 5E. In FIG. 5F, the support jig 46 of FIG. 5E is omitted for drawing convenience. FIG. 5G is an illustration of the cutting step in which cutting is applied on the joint 36 between the liner halves 31 that are integrated in the welding step.

<Arranging Step of Liner Half>

In the arranging step of liner halves 31 (see FIG. 2), the pair of the liner halves 31 is prepared as described above.

The liner half 31 in the present embodiment is assumed to be produced by an injection molding. The mold for molding this liner half 31 includes a cavity that are surrounded, for example, by a fixed mold imitating an outer shape of the mirror part 6 (see FIG. 1) of the liner half 31 and a half of the body part 5 (see FIG. 1), a movable mold imitating their inner shapes, and a stripper plate mold imitating a shape of the flange part 32 (see FIGS. 3A and 3B), although the figure is omitted.

The liner half 31 is obtained by heating and melting the aforementioned thermoplastic resin, injecting it into the above-mentioned mold, and then cooling it. And, when the liner half 31 is removed from the mold by mold opening, the liner half 31 has the burrs 48 (see FIG. 5B) described below unavoidably formed in a portion corresponding to a boundary between the movable mold and the stripper plate mold. The burra 48 are formed such as extending between the end surfaces 34a (see FIG. 5B) of the protruding ends 34 (see FIG. 5B) of the liner halves 31 due to a positional relation of the liner half 31 produced in the mold with a boundary between the movable mold and the stripper plate mold, which is explained in detailed below.

In this arranging step, the liner halves 31 are temporarily assembled to the support jig 46, as shown in FIGS. 3A and 3B. At this time, a clearance CL is formed between the bottom surface 32a1 of the circumferential groove 32a of the flange 32 and the end surface 46a1 of the inner claw 46a of the support jig 46.

<Step of Adjusting Parallelism Between Liner Halves>

Next, the parallelism adjustment step places the parallelism adjustment jig 47 shown in FIG. 2 on the lower liner half 31. And then, the lower liner half 31 that has been temporarily assembled on the support jig 46 of the lower support section 42b is then lifted up by the lifting mechanism 43 while the parallelism adjustment jig 47 is placed on the lower liner half 31.

This lifting up causes the parallelism adjustment jig 47 to be sandwiched between the upper liner half 31 and the lower liner half 31, as shown in FIG. 5A.

As shown in FIG. 5B, a driving force of the lifting mechanism 43 (see FIG. 2) causes the upper and lower liner halves 31 to apply loads to the parallelism adjustment jig 47, and the reaction force to the loads eliminates the clearance CL (see FIGS. 3A and 3B) between the bottom surface 32a1 of the circumferential groove 32a of the flange 32 and the end surface 46a1 of the inner claw 46a of the support jig 46.

In other words, the end surface 46a1 of the inner claw 46a and the bottom surface 32a1 of the circumferential groove 32a are in close contact.

On the other hand, there are burrs 48 between the liner halves 31. Specifically, these burrs 48 are formed at the boundary between the movable mold forming the inner circumferential surface 31a of the liner half 31 and the stripper plate mold forming the flange portion 32, as described above. This causes the burrs 48 to extend along this boundary, leading to be formed so as to extend from a corner 49, which is formed by the inner circumferential surface 31a of the liner half 31 and the end surface 34a of the protruding end 34, to a space between the liner halves 31, as shown in FIG. 5B. The burrs 48 extend in a shape of an unfixed ribbon along the circumference of the opening 33 of the liner half 31.

In contrast, the parallelism adjustment jig 47 in the present embodiment is positioned in a direction away from the openings 33 of the liner halves 31 to avoid the burrs 48 between the liner halves 31. Specifically, the parallelism adjustment jig 47 is positioned between the inner claws 46a of the upper support jig 46 and the lower support jig 46 so as to be vertically aligned with the inner claws 46a.

The above-described parallelism adjustment step places the parallelism adjustment jig 47 between the liner halves 31 in a state of avoiding the burrs 48, and adjusts the parallelism between the liner halves 31 and the support jig 46 within a predetermined range.

<Heating Step of Liner Halves>.

Next, the heating step of the protruding end 34 (see FIGS. 3A and 3B) of the liner half 31 is described.

As shown in FIG. 5C, the heater 40 is placed between the liner halves 31.

Specifically, as shown in FIG. 2, the transport mechanism 45 slides to position the heater 40 above the lower liner half 31. At this time, a predetermined gap D described below (see FIG. 5D) is opened between the heating source 44a of the lower heater 40b and the lower liner half 31.

Lifting up of the pair of heaters 40a and 40b is then performed by the lifting mechanism 43, while the heater 40 and the lower liner half 31 are kept away with their predetermined gap D (see FIG. 5D).

As shown in FIG. 5D, this lifting up causes the end surface 34a of the protruding end 34 in the upper liner half 31 to face the heating source 44a of the upper heater 40a apart from each other with the predetermined gap D between them.

The heating source 44a of the lower heater 40b faces the end surface 34a of the protruding end 34 of the lower liner half 31 apart from each other with a predetermined gap D between them, as described above.

Further, this heating step causes the heater 40 to heat and melt the melting allowance 35 of the protruding end 34.

In addition, the heating step causes the heater 40 to melt the burrs 48, and further to integrate molten material of the burrs 48 with the molten melting allowance 35, which molten material is absorbed into the molten melting allowance 35 by surface tension. In this way, the burrs 48 between the liner halves 31 disappear.

<Welding Step of Liner Halves>

Next, description is given of the welding step between the liner halves 31.

In this welding step, the heater 40 (see FIG. 5C) is moved by the transport mechanism 45 (see FIG. 2) to go away from between the liner halves 31. Specifically, it moves to an initial position shown in FIG. 2.

Then, the lifting mechanism 43 (see FIG. 2) lifts the lower liner half 31 further upward from the height shown in FIG. 5C.

As shown in FIG. 5E, the ends of the upper and lower liner halves 31 are welded together.

Specifically, in this welding step, as shown in FIG. 5F, the support jig (omitted in FIG. 5F) presses the liner halves 31 against each other with a predetermined load to cause molten materials 35a of the melting allowance 35 (see FIG. 5D) to flow in a directions that intersects the pressing directions (directions along the axis Ax) of the liner halves 31. This results in the molten materials 35a of the liner halves 31 to melt into each other at the welding surface 36a shown by the virtual line (double-dotted line in FIG. 5F). And then, as the molten material 35a are cooled down, the liner halves 31 are united and connected to each other at the welding surface 36a.

In the above-described welding step, the liner halves 31 may be vibrated by a vibrating device to accelerate the welding of the liner halves 31 when they are united at the welding surface 36a.

<Cutting Step>

Next, in the cutting step of the integrated liner halves 31, as shown in FIG. 5G, the flanges 32 (shown as the virtual line (two dotted lines) in FIG. 5G) of the joint 36 are removed by cutting except their root portions 32c.

The root portions 32c being left are used to form the diameter-expanded portion 9 of the liner 2 described above. This completes a series of manufacturing steps for the liner 2 of the present embodiment (see FIG. 1).

<<Effects>>.

Next, description is given of effects of the present embodiment using the manufacturing method and the manufacturing device A of the liner 2 that implements this manufacturing method.

In the manufacturing method and manufacturing device A of the liner 2 of the present embodiment, the parallelism between the end surfaces 34a of the liner halves 31 (protruding ends 34) is adjusted before welding together the liner halves 31 (protruding ends 34). In addition, as shown in FIG. 5B, this parallelism adjustment is done by clamping in advance the parallelism adjustment jig 47 between the end surfaces 34a of the liner halves 31 (protruding ends 34) to avoid the burrs 48 formed on the end surfaces 34a of the liner halves 31 (protruding ends 34).

Figure 6:
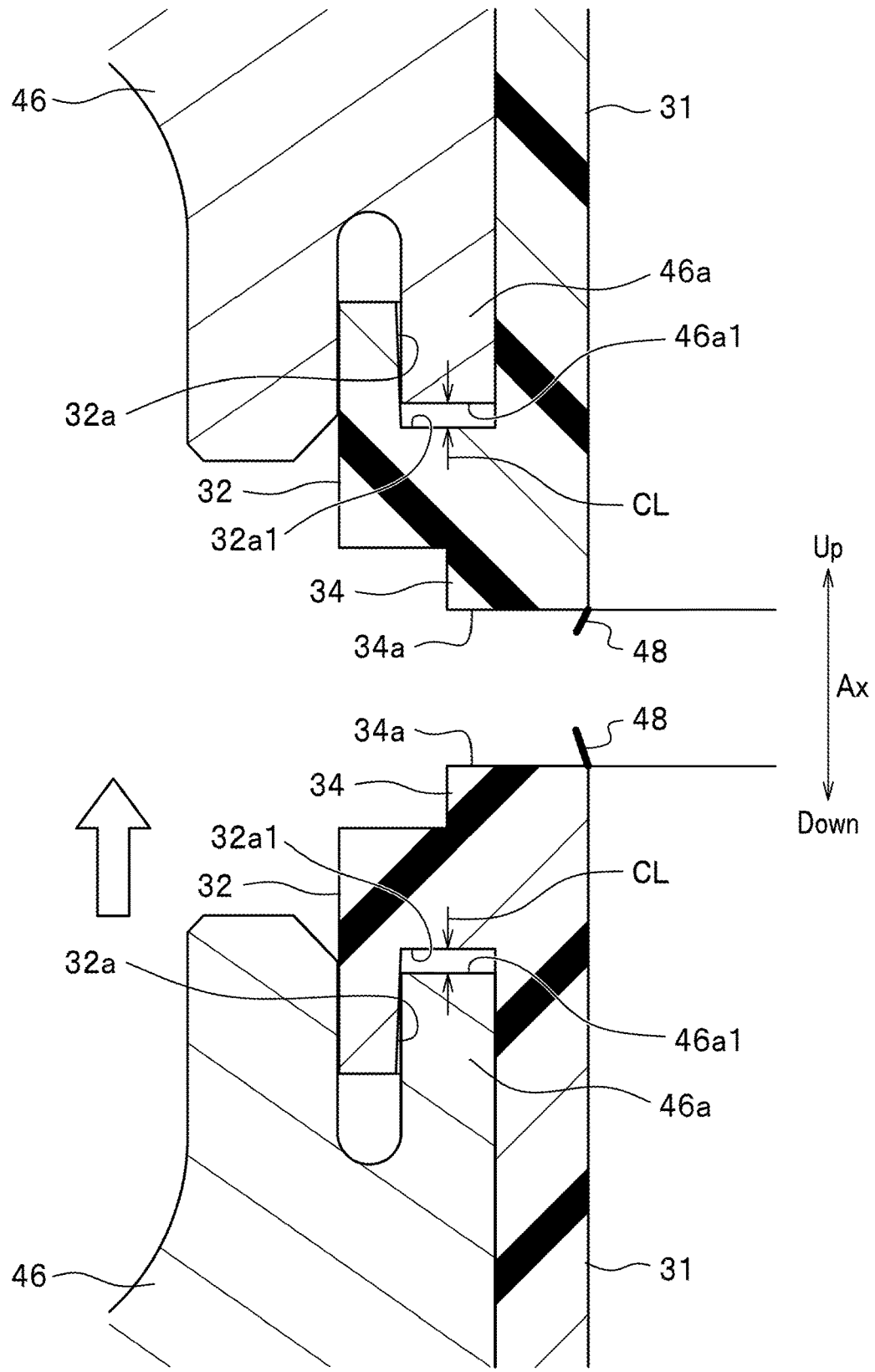
FIG. 6 is an illustration of a step of adjusting parallelism in a manufacturing method according to a comparative example.

FIG. 6, which this paragraph refers to, is an illustration of the parallelism adjustment step of the manufacturing method according to a comparative example.

As shown in FIG. 6, the manufacturing method according to this comparative example differs from the manufacturing method of the present embodiment in that the parallelism adjustment jig 47 (see FIG. 5B) is not placed between the end surfaces 34a of the liner halves 31 (protruding ends 34).

In other words, in the parallelism adjustment step of the manufacturing method according to this comparative example, the burrs 48 are sandwiched between the end surfaces 34a of the liner halves 31 (protruding ends 34), when the lower liner half 31 is lifted up in the direction of the white arrow by the lifting mechanism 43 shown in FIG. 2. Therefore, in the manufacturing method according to the comparative example, the parallelism between the end surfaces 34a of the liner halves 31 (protruding ends 34) is prevented by the burrs 48. This means that the clearance CL between the bottom surface 32a1 of the circumferential groove 32a of the flange 32 and the end surface 46a1 of the inner claw 46a of the support jig 46 may not be eliminated uniformly in the circumferential and radial directions of the circumferential groove 32a.

In contrast, as shown in FIG. 5B, the manufacturing method and manufacturing device A according to the present embodiment allows the parallelism adjustment jig 47 to ensure the parallelism without interference by the burrs 48 by sandwiching the parallelism adjustment jig 47 between the end surfaces 34a of the upper and lower liner halves 31 (protruding ends 34) while avoiding the burrs 48.

Further, the manufacturing method and manufacturing device A according to the present embodiment prevents the end surfaces 34a of the liner halves 31 (protruding ends 34) from being damaged by the burrs 48, because the burrs 48 are not pinched between the end surfaces 34a of the liner halves 31 (protruding ends 34), unlike the conventional method and device. Further, in the present embodiment, the parallelism adjustment jig 47 is positioned while avoiding the burrs 48, which consequently prevents the burrs 48 from being pinched between the end surfaces 34a.

In addition, in the manufacturing method and manufacturing device A according to the present embodiment, although the burrs 48 are formed on the inner circumference of the end surface 34a of the liner half 31 (protruding end 34), the parallelism adjustment jig 47 is positioned radially outward from the corner 49 of the liner half 31.

The above described manufacturing method and manufacturing device A according to the present embodiment is able to prevent interference from the burrs 48 more reliably in the parallelism adjustment step between the end surfaces 34a of the liner halves 31 (protruding ends 34). Therefore, the present embodiment allows more reliably preventing the parallelism adjustment jig 47 from being misaligned with respect to the liner half 31 in the parallelism adjustment step.

In this manufacturing method according to the present embodiment, the burrs 48 are melted together with the end surface of the liner half 31 and disappear in the melting step.

According to the present embodiment, the interference from the burrs 48 is completely eliminated in the welding step of the end surfaces 34a of the liner halves 31 (protruding ends 34).

Furthermore, the manufacturing method and manufacturing device A according to the present embodiment arranges the pair of support jigs 46 and the parallelism adjustment jig 47 so that they are aligned along a line (vertically in the present embodiment).

According to the above-described manufacturing method and manufacturing device A, the parallelism adjustment step transmits more efficiently the reaction force from the parallelism adjustment jig 47 via the liner half 31 (protruding end 34) to the support jig 46, and eliminates more efficiently the clearance CL between the bottom surface 32a1 of the circumferential groove 32a of the flange 32 and the end surface 46a1 of the inner claw 46a in the support jig 46. The parallelism between the end surfaces 34a of the liner halves 31 (protruding ends 34) is more reliably secured to be within a predetermined range.

Yet furthermore, in the manufacturing method and manufacturing device A according to the present embodiment, the parallelism adjustment jig 47 is assumed to be made of synthetic resin, elastomer, or metal.

The parallelism adjustment jig 47 made of synthetic resin or elastomer is able to prevent excessive stress on the liner half 31 during the parallelism adjustment step.

In addition, the parallelism adjustment jig 47 made of metal improves durability and accuracy of its positioning with respect to the end surface 34a of the liner half 31 (protruding end 34).

The present embodiment is described as the above, but the invention is not limited to the aforementioned embodiments but may be implemented in various types of embodiments.

Figure 7A:
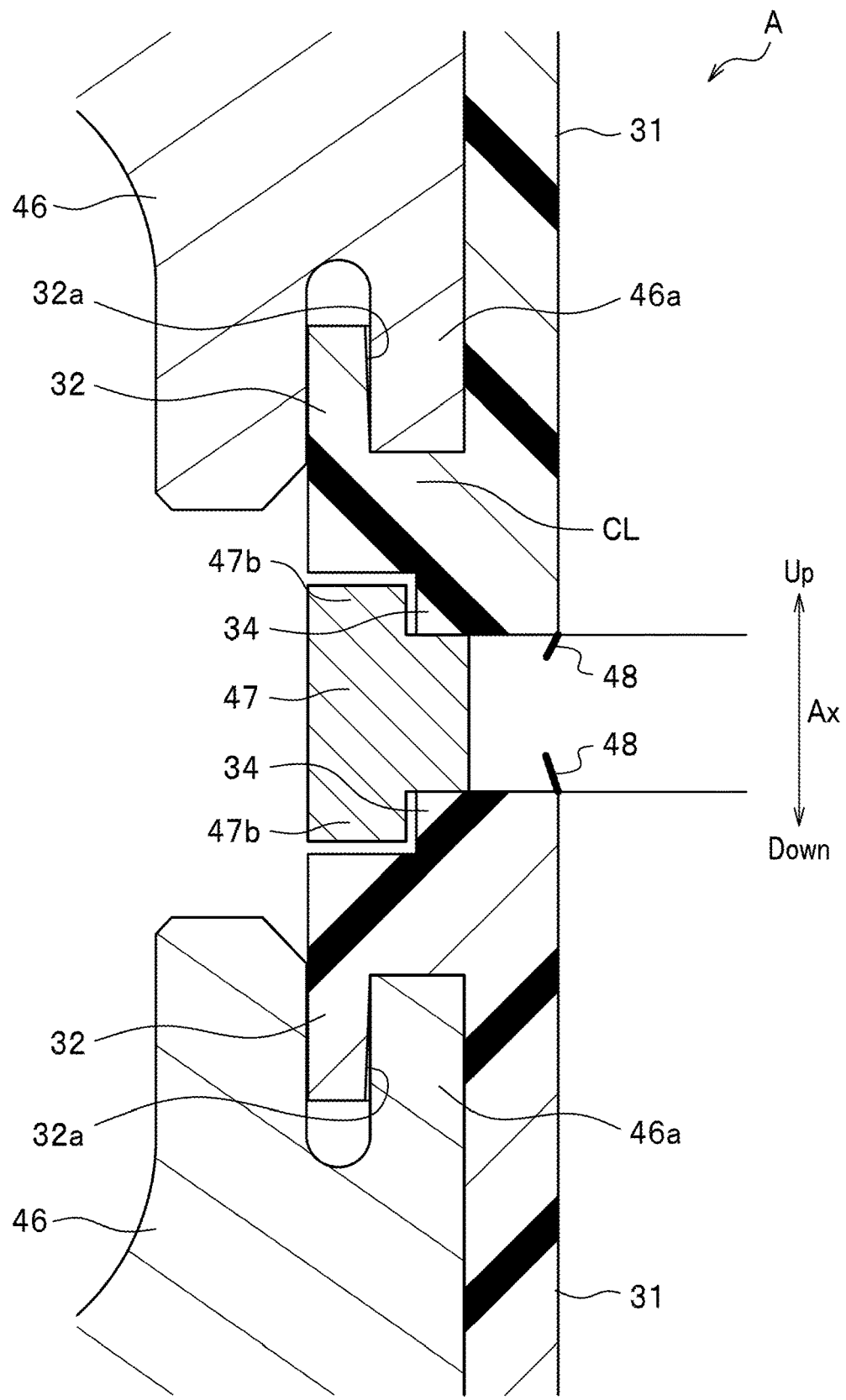
FIG. 7A is an illustration of a configuration of a manufacturing device according to a first modification example of the present invention.

FIG. 7A is an illustration of a configuration of a manufacturing device A according to the first modification of the present invention, and corresponds to FIG. 5B that shows the manufacturing device A of the embodiment of the present invention.

As shown in FIG. 7A, a parallelism adjustment jig 47 of the manufacturing device A according to the first modification includes an engagement portion for positioning 47b that determines a relative position with respect to the liner half 31 by fitting into the step portion between the flange 32 and the protruding end 34.

The manufacturing device A according to the first modification described above is able to more effectively prevent misalignment of the parallelism adjustment jig 47 with respect to the liner half 31 in the parallelism adjustment step.

Figure 7B:
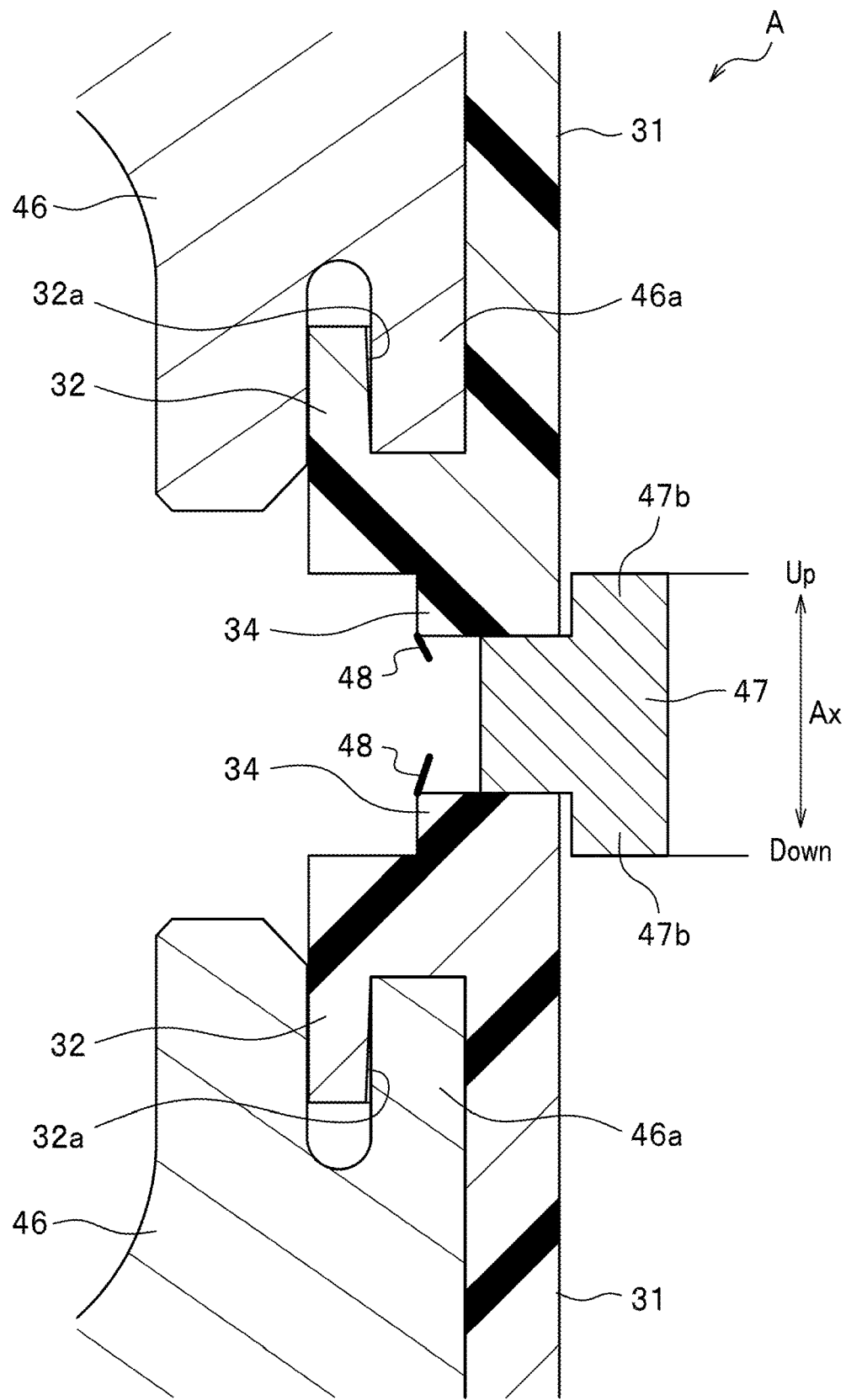
FIG. 7B is an illustration of a configuration of a manufacturing device according to a second modification example of the present invention.

FIG. 7B is an illustration of a configuration of the manufacturing device A according to the second modification of the present invention. FIG. 7B corresponds to FIG. 5B that shows the manufacturing device A of the embodiment described above.

As shown in FIG. 5B, in the manufacturing device A of the above embodiment, the parallelism adjustment jig 47 is positioned closer to the outer circumference of the protruding end 34 in consideration of the position of the burrs 48 formed on the end surface 34a of the liner half 31 (protruding end 34).

On the other hand, considering a case in which the mold splitting position of the stripper plate mold is changed with respect to the movable mold, the burrs 48 could be formed on the outer circumference of the protruding end 34, as shown in FIG. 7B.

Consequently, in the manufacturing device A according to the second modification, as shown in FIG. 7B, the parallelism adjustment jig 47 is positioned closer to the inner circumference of the protruding end 34 to avoid the burrs 48. Note that the reference sign 47b in FIG. 7B denotes an engagement portion for positioning that determines a relative position with respect to the liner half 31 by fitting into a corner portion at the inner circumference of the protruding end 34.

REFERENCE SIGNS LIST

1: High pressure tank
2: High pressure tank liner
4: Fiber-reinforced resin layer
5: Body part
8: Major portion of body part
9: Diameter-expanded portion
31: Liner half
31a: Inner circumferential surface of liner half
32: Flange of liner half
33: Opening of liner half
34: Protruding end of liner half
34a: End surface of liner half (of protruding end)
36: Joint
40: Heater
40a: Heater
40b: Heater
43: Lifting mechanism 45: Transport mechanism
46: Support jig
47: Parallelism adjustment jig
47b: Engagement portion for positioning
48: Burr
49: Corner between surfaces of inner circumference and protruding end of liner half
A: Manufacturing device of high-pressure tank liner
Ax: Axis of high pressure tank liner

The invention claimed is:

1. A manufacturing device of a high-pressure tank liner, the device comprising:
   a pair of support jigs supporting a pair of liner halves each at an outer circumference of end surfaces to be melted to be welded together;
   a parallelism adjustment jig, formed of an annulus having circumferentially extending end surfaces at each of a top end and a bottom end, for adjusting parallelism between the end surfaces of the pair of liner halves to be welded by being clamped with a predetermined load between the end surfaces of the liner halves arranged to face each other in a manner of avoiding burrs formed on the end surfaces of the liner halves; and
   a heater for heating to melt the end surfaces of the liner halves whose parallelism has been adjusted by the parallelism adjustment jig.

2. The manufacturing device of the high-pressure tank liner according to claim 1,
   wherein the parallelism adjustment jig is arranged to align with the pair of the support jigs along a vertical line, when the parallelism adjustment jig is clamped with the predetermined load between the end surfaces of the liner halves supported by the pair of support jigs.

3. The manufacturing device of the high-pressure tank liner according to claim 1,
   wherein the parallelism adjustment jig is provided with an engagement portion for positioning with respect to the liner halves when adjusting the parallelism between the end surfaces of the liner halves.

4. The manufacturing device of the high-pressure tank liner according to claim 1,
   wherein the parallelism adjustment jig is made of synthetic resin, elastomer, or metal.

5. The manufacturing device of the high-pressure tank liner according to claim 1, wherein
   each of the liner halves includes a cylindrical body;
   the burrs are formed such as they originate from corners to extend between the end surfaces of the liner halves, the corners each being formed by an inner circumference and the end surface of each of the liner halves; and
   the parallelism adjustment jig is positioned radially outward from the corners of the liner halves.

6. A method for manufacturing a high-pressure tank liner using the manufacturing device according to claim 1, the method comprising:
   arranging the pair of liner halves so that the liner halves face each other;
   adjusting parallelism between end surfaces of the liner halves using the parallelism adjustment jig; and
   welding the end surfaces of the liner halves together to integrate the liner halves using the heater and the pair of support jigs,
   wherein the adjusting parallelism is performed by clamping the parallelism adjustment jig between the end surfaces of the liner halves in the manner of avoiding burrs formed on the end surfaces of the liner halves.

7. The method for manufacturing the high-pressure tank liner according to claim 6,
   wherein
   each of the liner halves includes a cylindrical body;
   the burrs are formed so that they originate from corners to extend between the end surfaces of the liner halves, the corners each being formed by an inner circumference and the end surface of each of the liner halves; and
   the parallelism adjustment jig is positioned radially outward from the corners of the liner halves.

8. The method for manufacturing the high-pressure tank liner according to claim 6,
   wherein the welding includes: melting the end surfaces of the liner halves by heating the end surfaces using the heater; and supporting each of the liner halves so that the end surfaces of the liner halves melted are welded together using the pair of support jigs, and
   wherein the burrs are melted together with the end surfaces of the liner halves to disappear during the melting.

* * * * *